May 17, 1932.  E. L. BROWN  1,859,251
COUPLING
Filed Aug. 10, 1929
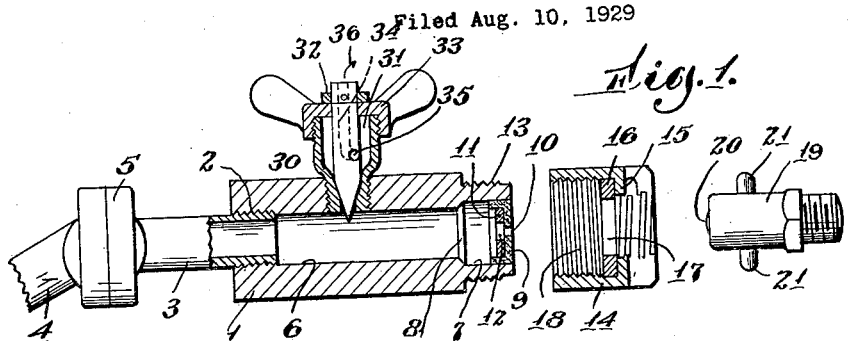
Fig. 1.
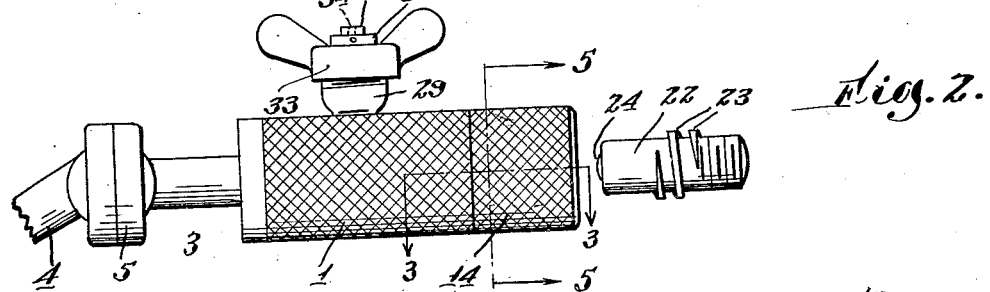
Fig. 2.
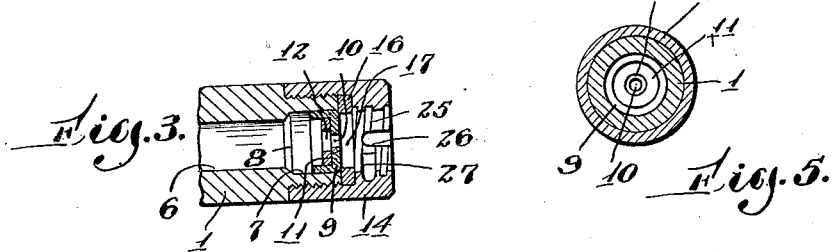
Fig. 3.   Fig. 5.
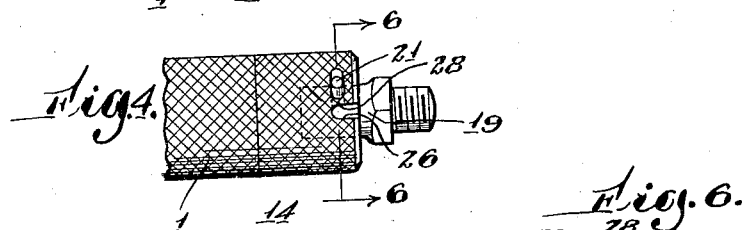
Fig. 4.   Fig. 6.
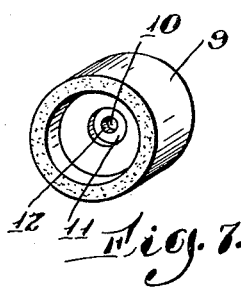
Fig. 7.
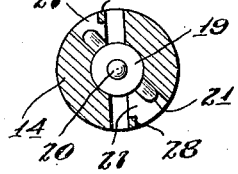
Inventor
Ernest L. Brown,
by Harold J. Clark.
Attorney Patented May 17, 1932

1,859,251

UNITED STATES PATENT OFFICE

ERNEST L. BROWN, OF WATERTOWN, MASSACHUSETTS, ASSIGNOR TO BETTER-BUILT PUMPS, INC., OF CAMBRIDGE, MASSACHUSETTS, A CORPORATION OF MASSACHUSETTS

COUPLING

Application filed August 10, 1929. Serial No. 384,940.

My present invention relates to couplings, and more particularly to a novel and improved coupling adapted to detachably connect a nipple or other fitting and a lubricant conducting conduit.

There are, at present, several different types of nipples or fittings utilized on bearings or other points to be lubricated. The two most widely used nipples or fittings are those in which a transverse pin is utilized to hold the adapter to the fitting while the lubricant is being delivered, and those utilizing a threaded portion to hold the adapter to the fitting while the lubricant is being delivered. In many lines of industries, particularly the automobile lubricating field, this use of differing types of nipples represents considerable inconvenience. For example, if a service station has completed the greasing or lubricating of an automobile fitted with the pin type of nipple, and the next automobile to be greased is equipped with the threaded nipples, the operator must remove the adapter which he has been using for the conduit, and substitute therefor an adapter which will accommodate the threaded type of nipple. This results in great inconvenience, and additional expense, requiring service stations to carry two or more sets of adapters applicable to a common conduit. An important object of the present invention, therefore, is the provision of an adapter so constructed as to be applicable with equal facility to either of the above mentioned types of nipples or fittings. The advantages incident to my novel adapter are numerous, and will be readily understood and appreciated by those skilled in this art. Thus an operator can turn from an automobile fitted with pin type nipples to an automobile fitted with threaded nipples, without hesitation, loss of time, or the inconvenience required to disconnect one adapter and connect another one.

I accomplish this desirable result by providing an adapter having an internal threaded portion to fit or accommodate the threaded type of nipples. I also provide said adapter with a pair of bayonet joint slots, intersecting the internal threaded portion, but not interfering with the threading of said portion onto a threaded nipple. I thus effect a considerable saving in manufacturing expense, because of the fact that a single adapter will fulfill the functions for which two separate adapters have heretofore been required.

A further feature of my present invention resides in the provision of means to obtain a lubricant-tight joint between the coupling and the nipple, by means of a simple and inexpensive structure.

A further feature of my invention resides in the elimination of springs, such as have heretofore been utilized to accomplish a preliminary sealing effect, I rely entirely upon the pressure of the lubricant through the coupling to obtain said lubricant-tight joint.

Further features of the invention reside in the particular construction of the adapter, and of the sleeve to which said adapter is attached to form my complete novel coupling.

A further feature of the invention resides in the provision of means in said sleeve to relieve the pressure against the adapter in the case of a "frozen" fitting. To accomplish this desirable result I utilize a novel type of bleeder valve, said valve being simple in construction and operation, but quickly and efficiently relieving the pressure against the adapter and nipple.

The above and other objects of my invention will be hereinafter more fully pointed out, described and claimed.

Referring to the drawings, illustrating a preferred embodiment of the present invention, Fig. 1 is a longitudinal sectional view of my novel coupling in disassembled form;

Fig. 2 is a side elevation of the coupling in assembled condition;

Fig. 3 is a longitudinal sectional view on the line 3—3 of Fig. 2;

Fig. 4 is a fragmental side elevation of the coupling with the adapter fitted to a nipple of the pin type;

Fig. 5 is a vertical sectional view on the line 5—5 of Fig. 2;

Fig. 6 is a vertical sectional view on the line 6—6 of Fig. 4; and

Fig. 7 is a perspective view of the cup-shaped gasket utilized.

Referring now to the drawings for a particular description of the invention, its construction, assembly and use, 1 designates a sleeve having an internal threaded portion 2 adapted to receive an extension 3 of a lubricant conduit 4, a universal joint 5 being provided between said conduit and said extension to permit movement of said sleeve 1 into desired position.

Said sleeve is provided with a longitudinal bore 6, and with a recess 7 communicating with but of greater diameter than said bore, a shoulder 8 being formed between said recess and said bore.

Slidably mounted in said recess is a cup-shaped gasket 9 having a central aperture 10 therethrough, and seated in the interior of said gasket is a metallic disc or washer 11 provided with a central aperture 12 in register with the aperture 10. This gasket 9 is slidable in said recess 7, being limited in its movement in one direction by the shoulder 8. The end of the sleeve which contains the recess 7 is reduced in diameter and has an external threaded portion 13, to which is adapted to be threaded my novel adapter 14, said adapter having a shoulder 15 therein, a metallic washer 16 bearing against said shoulder 15 and having a central aperture 17 therethrough. The interior of the adapter is threaded, as illustrated at 18, for engagement with the threaded portion 13 of the sleeve 1.

Fig. 2 illustrates the adapter 14 united to the sleeve 1, and in this assembled position the coupling is ready for use. In Fig. 1 is illustrated a nipple 19 such as is commonly used at present, having a spring pressed ball 20 normally adapted to close the entrance to said nipple, and a transverse pin 21 being provided. In Fig. 2 a nipple 22 of the threaded type is illustrated, having an external thread 23 and a spring pressed ball 24. My novel adapter will fit either of these nipples with equal facility and efficiency. The adapter 14 is provided with an internal threaded portion 25, adapted to be threaded onto the external thread 23 of the nipple 22, and is also provided with a pair of longitudinally extending slots 26, communicating with circumferential slots 27, to accommodate the pin 21.

When my adapter is applied to a nipple of the type illustrated in Fig. 1, the slots 26 are alined with the pin 21, the adapter is pushed onto said nipple until the ends of the pin 21 are alined with the circumferential slots 27, whereupon the adapter is turned until the ends of the pin 21 are seated in said slots 27. This will effect a holding of the adapter to the nipple 19. When the adapter is utilized in conjunction with a nipple of the type 22, the adapter, by means of the sleeve 1, is threaded to said nipple, the internal and external threads described providing the holding means.

The aperture 17 in the washer 16 is of sufficient diameter to permit the passage of the outer end of the nipple 19 or the nipple 22 therethrough, but said aperture 17 is of smaller diameter than the diameter of the gasket 9, and said washer 16 will therefore constitute an abutment for the gasket 9 when said gasket is forced thereagainst by the lubricant progressing through the sleeve. Means is thus provided to limit movement or sliding of the gasket 9 in either direction. When my adapter is attached to a nipple, the outer end of said nipple will extend through the aperture 17 in the washer 16, and will push said gasket away from the washer 16. When lubricant is forced through the coupling under pressure, however, said pressure will force the gasket 9 against the outer end of the nipple, unseating the ball 20 or 24 as the case may be, from its seat, and effecting a lubricant-tight fitting between the gasket 9 and the end of said nipple. The unseating of the ball in the nipple will permit the passage of the lubricant through the apertures 12 and 17 and through the nipple into the bearing or other point to be lubricated. The gasket 9 is preferably formed of leather and the metal washer 11 will prevent collapsing, bending or tearing of said gasket.

As illustrated in Fig. 6, the circumferential slots 27 are undercut, leaving a solid metallic portion 28, which will greatly reinforce and strengthen the adapter, leaving no free ends to be broken or chipped.

It frequently happens that a bearing is "frozen", rendering it impossible to discharge lubricant through the fitting or nipple associated with such bearing. When this occurs, tremendous pressure is built up in the conduit 4 and coupling, rendering it difficult, if not impossible, to disunite the coupling from the fitting or nipple. In order to obviate this difficulty I provide a novel type of bleeder valve, comprising a casing 29 threaded through the sleeve 1, and having a pin or needle 30 adapted to normally seat in said casing. Said casing is hollow, as illustrated at 31; and the needle 30 is affixed to a collar 32 on a wing cap or nut 33, said needle having a central bore 34 extending partially therethrough, and having an inlet port 35 into which lubricant will flow and be discharged at the top, as illustrated by the arrow 36. When a bearing is "frozen", the cap 33 is partially unthreaded from the casing 29, raising the needle 30 from its seat and permitting the passage of lubricant into the hollow interior 31, whence it will enter the port 35 and be discharged through the bore 34, thus relieving the pressure on the coupling, and enabling it to be disunited from the nipple. When the coupling has been removed, the needle 30 will, of course, again be seated in the casing 29 to form a lubricant-tight joint at this location.

When the coupling is affixed to a nipple, and lubricant under pressure is forced through the bore 6 and recess 7, the pressure of said lubricant will force the wall of the gasket 9 against the wall of said recess, preventing the leakage of lubricant past said gasket at that point, and said pressure will also seat said gasket smoothly, snugly and firmly against the end of said nipple, preventing the leakage of lubricant between said gasket and said nipple, and directing the lubricant into the bore of the nipple which is normally closed by the spring pressed ball. I utilize no springs or other mechanical devices to obtain these lubricant-tight fits or joints, relying entirely on the pressure of the lubricant being forced through the coupling to accomplish these results.

It will thus be seen that I have devised an extremely simple, inexpensive, efficient and positive acting coupling and adapter, and since I believe the same to be novel, I have claimed said coupling and adapter herein.

While I have necessarily described my present invention somewhat in detail, it will be appreciated that I may vary the size, shape, and arrangement of parts, within reasonably wide limits without departing from the spirit of the invention.

My invention is further described and defined in the claim as follows:

A coupling of the character described comprising a sleeve adapted for connection at one end with a source of lubricant supply, an adapter threaded on the other end of said sleeve, a gasket interposed between said adapter and the adjacent end of said sleeve and projecting into the bore of said adapter, a second gasket slidable within the sleeve and limited against sliding movement in the direction of the adapter by said first mentioned gasket, said adapter and said first mentioned gasket having alined openings to receive a nipple and to permit direct engagement of the end of the nipple with said second mentioned gasket.

In testimony whereof I have signed my name to this specification.

ERNEST L. BROWN.